Patented Feb. 26, 1946

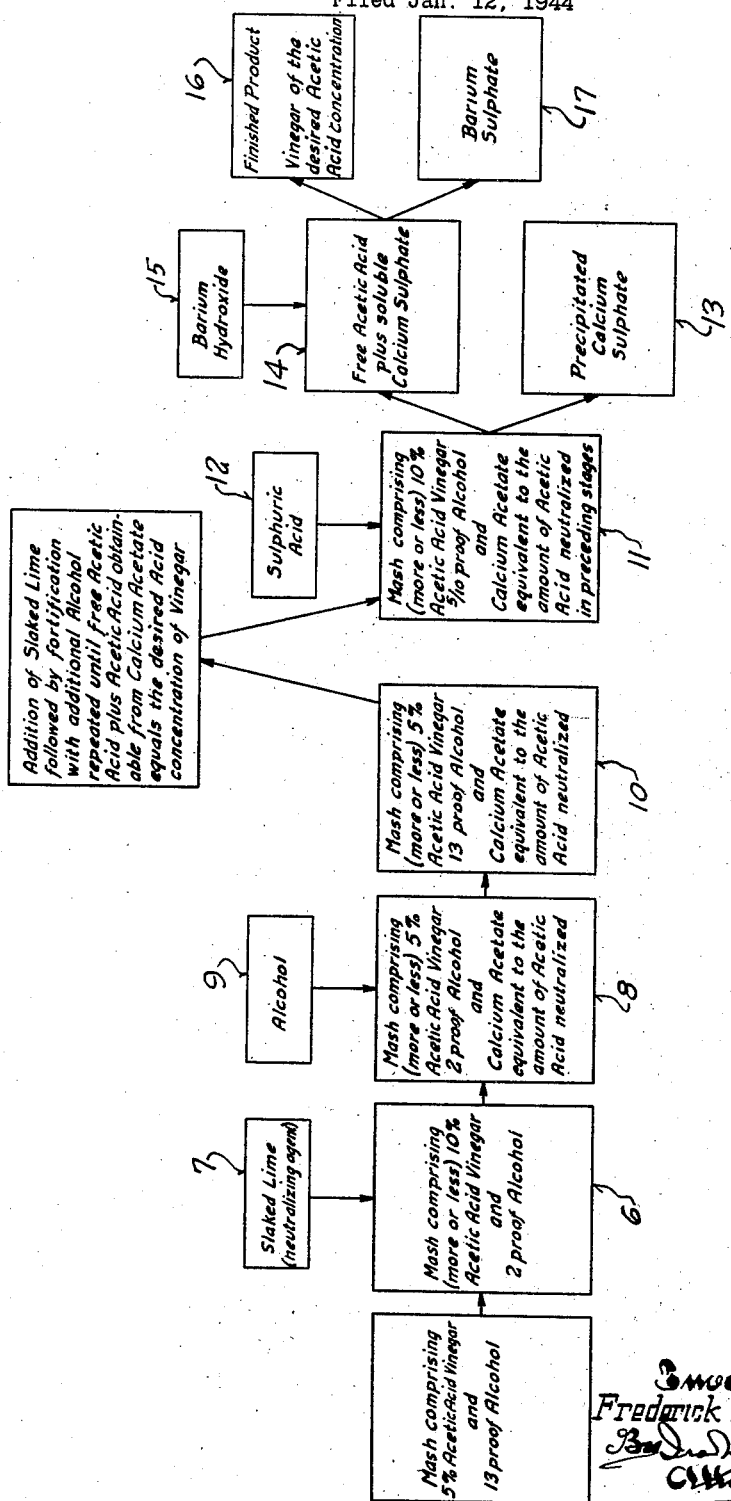

2,395,510

UNITED STATES PATENT OFFICE 2,395,510

METHOD OF MAKING HIGH STRENGTH VINEGAR

Frederick C. Silbernagel, Manitowoc, Wis., assignor to A. M. Richter Sons Co., Manitowoc, Wis., a corporation of Wisconsin Application January 12, 1944, Serial No. 517,968

6 Claims. (Cl. 99—147)

This invention relates to the manufacture of vinegar. As is well known, vinegar is made by oxidizing an alcoholic mash with vinegar bacteria.

During the fermentation, the vinegar bacteria feeding on the alcohol content of the batch produces acetic acid. With past methods of making vinegar, it has been impossible to produce natural vinegar with a higher percentage of acetic acid than twelve (12) to twelve and one-half per cent (12½%), as twelve and one-half per cent (12½%) acetic acid is the extreme limit of acidity which vinegar bacteria can withstand.

Vinegar with a higher acetic acid content is, of course, very desirable. Aside from the saving in freight resulting from the use of higher strength vinegar, there is the more important advantage of materially reducing waste in the processing of pickled foods.

In the preparation or processing of pickled foods, the vegetable or fruit juices dilute the vinegar-sugar brine below the point of safe concentration of acid. It thus becomes necessary for the manufacturer to increase the acidity of the brine by adding fresh vinegar.

Obviously, the stronger the vinegar that is used, the less waste material composed of dilute vinegar and other valuable constituents, such as sugar and spices, need be discarded.

To illustrate, the average pickle packing plant operating on vinegar of 12% acetic acid content, after several months of operation will have an appreciable amount of liquor on hand containing insufficient acetic acid and sugar and spices.

In an effort to conserve these essential ingredients, some food processors have used commercial acetic acid not produced by the fermentation process. The use of commercial acetic acid, however, is not in the best interests of pure food.

Hence, it is the general purpose of this invention to produce vinegar containing a higher percentage of acetic acid. In a broad sense, this has been accomplished in the past, but not in the actual production of the vinegar but rather as an adjunct thereto.

This past method consisted generally in the production of vinegar in the ordinary manner followed by freezing out part of the water content to thereby increase the concentration of acetic acid. While the freezing method succeeds in supplying pure vinegar of higher than 12% concentration, it involves an expensive process, and, as stated, is not the result of the actual production of the vinegar itself, but rather that of a subsequent process.

It is, therefore, another object of the present invention to produce vinegar having an acetic acid content higher than 12½%, which involves no subsequent process, but accomplishes its objective in the actual production of the vinegar.

Still another object of this invention is to provide a new and improved method of making vinegar which although resulting in a product containing a considerably higher percentage of acetic acid, nevertheless can be practiced with substantially the same equipment now used in the manufacture of ordinary vinegar.

With the above and other objects in view, which will appear as the description proceeds, this invention resides in the novel product and process of producing it substantially as hereinafter described, and more particularly defined by the appended claims, it being understood that such changes in the precise embodiment of the herein disclosed invention may be made as come within the scope of the claims.

In a broad general way this invention consists in neutralizing the acetic acid produced by the fermentation of the mash to produce an acetate unharmful to vinegar bacteria, followed by the addition of alcohol to restore the substrate upon which the bacteria acts so that the bacterial action can be repeated to produce more acetic acid.

Such neutralization of the produced acetic acid followed by the addition of alcohol is repeated often enough to insure the desired concentration of acetic acid. Thereafter the mash is treated with a suitable reagent to free the acetic acid, the precipitated calcium sulphate being removed by filtration.

Specifically and as illustrated in the block diagram on the accompanying drawing, the invention consists of the following process:

The process is started in the customary manner by placing the mash in a conventional enclosed vinegar generator. Into this mash sufficient alcohol is added to bring the entire contents to 13 proof alcohol so that with the addition of a sufficient quantity of vinegar as a starter, fermentation begins.

For a specific illustration, the vinegar may be of a 5% acetic acid concentration. Also the amount of alcohol added need not raise the proof to 13, but for purposes of illustration, this value has been chosen as it represents substantially the maximum concentration of alcohol which will not inhibit the bacterial action.

The mash is circulated over the upper reaches of the generator which contains the filling impregnated with vinegar bacteria so that oxidation of the alcohol content proceeds.

This oxidation is allowed to continue until all but approximately 2 proof of the alcohol is oxidized to acetic acid.

At this stage, as depicted by the block 6 in the block diagram, the mash contained in the generator comprises approximately 2 proof alcohol and approximately 10% acetic acid.

A sufficient quantity of slaked lime is then added (as indicated by the block 7 of the diagram) to the vinegar in the storage chamber of the generator to neutralize a portion of the acetic acid contained in the mash. The amount of acetic acid neutralized is not critical and for purposes of illustration, the diagram shows about a 50% neutralization.

As indicated by block 8, about half of the acetic acid, upon addition of the slaked lime, becomes bound in calcium acetate. A sufficient quantity of alcohol is then added (as indicated by block 9) to the mash to restore the proof to the original reading of 13. This is indicated by block 10.

The resulting mash is continuously circulated over the filling of the generator in the conventional manner until the newly added alcohol has been converted into acetic acid.

The addition of the slaked lime followed by restoration of the alcohol proof and oxidation of the alcohol is repeated until the free acetic acid plus the acetic acid obtainable from the calcium acetate equals the amount desired, the process having been practiced to the point of producing vinegar of 16% acetic acid concentration. No reason appears, however, why the process cannot be used to produce vinegar of much higher acetic acid concentration.

The entire mash is then discharged into an acidifying tank (as indicated by block 11) and sufficient sulphuric acid (block 12) is added to exactly combine with the calcium acetate content.

The reaction produces calcium sulphate (block 13) which is precipitated out and the free acetic acid (block 14) is then liberated from the calcium acetate. Traces of calcium sulphate in solution may be present in the acetic acid. If so all sulphate ion can be removed by treatment with a calculated amount of barium hydroxide (block 15).

The resulting vinegar (block 16) is entirely free of sulphate ion and has the desired concentration of acetic acid.

Most important, however, is the fact that all of the acetic acid is produced by the bacterial fermentation of the alcohol.

The calcium sulphate (block 13) or gypsum, as it is commercially known, can be filter pressed, dried and sold so that much of the original cost of the sulphuric acid can be reclaimed.

This likewise applies to the small amount of barium sulphate (block 17) which may result from the final purification of the acetic acid where this step is deemed necessary.

While slaked lime was used as the neutralizing agent in the carrying out process as described, calcium carbonate and calcium oxide may be substituted therefor, calcium carbonate having the advantage in that any traces thereof left in the generator would have no deleterious effect upon the bacteria, whereas traces of slaked lime and calcium oxide so deposited would be noxious.

Also, if cost were not a factor, the more expensive barium salts, barium oxide, barium hydroxide, or barium carbonate may be used as the neutralizing agent, and if used would obviate the final step of removing possible traces of sulphate ion.

From the foregoing description, it will be readily apparent to those skilled in the art, that this invention provides a method of producing so called high concentration vinegar which is wholly compatible with the pure food laws and one in which the entire process is one continuous sequence capable of being carried out with the equipment used in the ordinary manufacture of vinegar.

What I claim as my invention is:

1. A process of producing vinegar containing a percentage of acetic acid in excess of twelve per cent (12%) which comprises: oxidizing an alcoholic mash to vinegar by means of vinegar bacteria; sequentially neutralizing the acetic acid produced with a neutralizing reagent; refortifying the mash with alcohol to permit further oxidation by vinegar bacteria to acetic acid; and treating the solution with an acid to free the acetic acid from the acetate formed by the neutralization.

2. The process of producing vinegar having a higher than twelve percent (12%) acetic acid concentration which comprises: oxidizing the alcohol content of a vinegar producing mash to form acetic acid; adding a suitable calcium salt to the solution to neutralize its acid content and form calcium acetate; adding alcohol to the solution; causing fermentation of the refortified solution to oxidize the alcohol and produce more acetic acid; repeating the addition of the calcium salt and alcohol until the free acetic acid plus the acetic acid obtainable from the calcium acetate supplies sufficient acetic acid to give the vinegar the desired concentration; adding sulphuric acid to the solution to combine with the calcium acetate and free the acetic acid; and filtering out the calcium sulphate formed as the result of the addition of the sulphuric acid.

3. The process of producing vinegar having a higher than twelve percent (12%) acetic acid concentration which comprises: oxidizing the alcohol content of a vinegar producing mash to form acetic acid; adding slaked lime to the solution to neutralize its acid content and form calcium acetate; adding alcohol to the solution; causing fermentation of the refortified solution to oxidize the alcohol and produce more acetic acid; repeating the addition of the slaked lime and alcohol until the free acetic acid plus the acetic acid obtainable from the calcium acetate supplies sufficient acetic acid to give the vinegar the desired concentration; adding sulphuric acid to the solution to combine with the calcium acetate and free the acetic acid; precipitating the calcium sulphate resulting from the addition of the sulphuric acid; and removing any remaining traces of soluble sulphate from the solution by the addition of a suitable quantity of barium hydroxide.

4. The process of producing vinegar having a higher than twelve percent (12%) acetic acid concentration which comprises: oxidizing the alcohol content of a vinegar producing mash to form acetic acid; adding a metallic salt which will form an insoluble sulphate to the solution to neutralize part of its acid content and form an acetate of the metallic salt used; adding alcohol to the solution; causing fermentation of the refortified solution to oxidize the alcohol and produce more acetic acid; repeating the addition of the metallic salt and alcohol until the free acetic acid plus the acetic acid obtainable from the acetate supplies sufficient acetic acid to give the vinegar the desired concentration; and treating the solution with an acid to free the acetic acid from the acetate.

5. The process of producing vinegar having a higher than twelve percent (12%) acetic acid concentration which comprises: oxidizing the alcohol content of a vinegar producing mash to form acetic acid; adding a barium salt to the solution to neutralize part of its acid content and form an acetate of the barium salt used; adding alcohol to the solution; causing fermentation of the refortified solution to oxidize the alcohol and produce more acetic acid; repeating the addition of the barium salt and alcohol until the free acetic acid plus the acetic acid obtainable from the acetate supplies sufficient acetic acid to give the vinegar the desired concentration; and treating the solution with an acid to free the acetic acid from the acetate.

6. The process of producing vinegar having a higher than twelve percent (12%) acetic acid concentration which comprises: oxidizing the alcohol content of a vinegar producing mash to form acetic acid; adding calcium carbonate to the solution to neutralize part of its acid content and form a calcium acetate; adding alcohol to the solution; causing fermentation of the refortified solution to oxidize the alcohol and produce more acetic acid; repeating the addition of the calcium carbonate and alcohol until the free acetic acid plus the acetic acid obtainable from the calcium acetate supplies sufficient acetic acid to give the vinegar the desired concentration; and treating the solution with an acid to free the acetic acid from the calcium acetate.

FREDERICK C. SILBERNAGEL.